(12) United States Patent
Etoh et al.

(10) Patent No.: US 7,360,246 B2
(45) Date of Patent: Apr. 15, 2008

(54) COMMUNICATIONS MONITORING, PROCESSING AND INTRUSION DETECTION

(75) Inventors: Hiroaki Etoh, Kanagawa-ken (JP); Kunikazu Yoda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 10/672,342

(22) Filed: Sep. 26, 2003

(65) Prior Publication Data
US 2004/0123155 A1 Jun. 24, 2004

(30) Foreign Application Priority Data
Sep. 30, 2002 (JP) ............................ 2002-287758

(51) Int. Cl.
*G06F 11/30* (2006.01)
*G06F 15/173* (2006.01)
(52) U.S. Cl. .......................................... 726/13; 726/23
(58) Field of Classification Search ................ 709/224, 709/227; 713/153; 726/11, 13, 23
See application file for complete search history.

(56) References Cited
U.S. PATENT DOCUMENTS

| | | | |
|---|---|---|---|
| 6,711,615 B2 * | 3/2004 | Porras et al. ................. | 726/22 |
| 7,124,438 B2 * | 10/2006 | Judge et al. .................. | 726/22 |
| 2002/0144156 A1 * | 10/2002 | Copeland, III .............. | 709/224 |
| 2003/0105976 A1 * | 6/2003 | Copeland, III .............. | 709/224 |

* cited by examiner

*Primary Examiner*—Gilberto Barron, Jr.
*Assistant Examiner*—Laurel Lashley
(74) *Attorney, Agent, or Firm*—Louis P. Herzberg (57) ABSTRACT

Systems, apparatus and methods to monitor communications conducted via a host computer placed under the management of security measures such as firewalls or routers' filtering capabilities. A communications monitoring system which includes a packet input means for connecting to predetermined points on a network via a network interface and receiving communications packets flowing at the points; and matching means for performing real-time matching between two packet streams composed of received communications packets each time a communications packet is received. If the two packet streams are highly similar, it is highly likely that an attack or intrusion is being made and an alert is issued.

20 Claims, 9 Drawing Sheets

COMMUNICATIONS MONITORING, PROCESSING AND INTRUSION DETECTION

FIELD OF THE INVENTION

The present invention directed to technology for monitoring data communications on a network. More particularly, it is directed to a monitoring technology which can be used to detect intrusions into or attacks on networks or terminals.

BACKGROUND

A computer network typified by the Internet needs to be equipped with security measures to prevent the network or terminals connected to the network from being intruded or attacked (accessed) without authority.

As network security measures, firewalls are used commonly. For example, TCP connections are prohibited from passing a DMZ (De-Militarized Zone) constructed from a firewall on a boundary between the Internet and an intranet. Thus, direct connections from the Internet to the intranet can be prohibited by setting up firewall rules.

A router which connects networks incorporates a filtering capability to limit data communications (hereinafter referred to simply as communications) passing through it. This capability can be used to prevent unauthorized access between networks.

There are conventional techniques for tracing unauthorized access detected on a network. Such conventional techniques for tracing unauthorized access involves accumulating log data on communications packets (hereinafter referred to simply as packets) exchanged over a network in a predetermined storage (log box) together with their data size and detection time and tracing unauthorized access, if detected, by comparing the unauthorized access and accumulated log information (e.g., See Published Unexamined Patent Application No. 2001-217834 (pp. 6-8). These conventional techniques trace unauthorized access offline using the accumulated log information rather than in real time.

However, even if security measures such as firewalls and routers' filtering capabilities are installed on the network, it is not possible to prevent intrusions or attacks made via a host computer placed under the management of the security measures.

In the example above of installing a DMZ between the Internet and an intranet, since individual TCP connections via the DMZ are authorized, firewall rules cannot prohibit indirect connections from the Internet to the intranet through a TCP connection set up between the Internet and a server (e.g., Web server, DNS (Domain Name System) server, or mail server) in the DMZ and a TCP connection set up between the server in the DMZ and the intranet.

Also, when filtering capabilities of a router is used to limit communications, filtering on the router cannot prevent intrusions made in the following way. Specifically, an attacker intrudes a computer which will serve as a stepping stone, erases logs on the computer, and attacks another computer. As a result, it appears as if the attack were made from the computer serving as the stepping stone. Normally, an attacker attacks a target computer via two or more stepping stones. A computer can be used as a stepping stone even if it is not intruded itself. The use of a proxy server for relaying is a case in point. However, even if no real damage was done to the computer serving as a stepping stone, the fact that the computer was used as a stepping stone will ruin the reputation of the organization that manages the computer.

Since conventional techniques for tracing unauthorized access detected on a network does tracing through matching against communications logs, they can trace even communications conducted via a host computer placed under the management of security measures as described above. However, since they perform the matching process offline, they cannot monitor unauthorized access in real time when the communications are actually going on. Also, to trace unauthorized access, it would be advantageous to have communications logs known to be those of unauthorized access.

SUMMARY OF THE INVENTION

Thus, an aspect of the present invention is to make it possible to monitor communications conducted via a host computer as well as communications conducted directly.

Another aspect of the present invention is to make it possible to detect intrusions or attacks, including unauthorized access, in real time through such monitoring without the need for communications logs known to be those of unauthorized access.

To achieve the above aspects, the present invention is implemented as a communications monitoring system comprising: a packet input means for receiving communications packets flowing at arbitrary points on a network, and matching means for performing real-time matching between two packet streams composed of communications packets.

In this communications monitoring system, the packet input means may be a communications sensor connected to predetermined points (points where communications are to be monitored) on a network via a network interface while the matching means may be a similarity calculator which calculates formal similarity between two packet streams composed of communications packets entering the sensor upon arrival of the communications packets.

The present invention can also be implemented as a communications monitoring method for monitoring data communications on a network using a computer, comprising the steps of: acquiring communications packets in sequence from arbitrary points on a network and storing them in predetermined storage means together with information about a packet stream to which the communications packets belong; on reception of a predetermined communication packet, taking another communications packet received within a predetermined time before acquiring a predetermined communications packet, out of the storage means; determining formal similarity between the first packet stream which contains up to the acquired communications packet and a second packet stream to which the communications packet taken out of the storage means belong; and sending out a predetermined alert according to the determined similarity.

Also, the present invention is implemented as an information processing method for comparing two packet streams flowing on a network, comprising the steps of: acquiring communications packets in sequence from arbitrary points on a network and storing them in predetermined storage means together with information about a packet stream to which the communications packets belong; on reception of a predetermined communication packet, taking another communications packet received within a predetermined time before acquiring a predetermined communications packet, out of the storage means; and performing matching between the first packet stream which contains up to the acquired communications packet and a second packet stream to which the communications packet taken out of the storage means belong.

BRIEF DESCRIPTION OF THE DRAWINGS

These and other objects, features, and advantages of the present invention will become apparent upon further consideration of the following detailed description of the invention when read in conjunction with the drawing figures, in which.

Description of Symbols
10. Communications sensor
20. Packet database (DB)
30. Match candidate database (DB)
40. Similarity calculator
50. Candidate discarder
101. CPU
102. Memory
103. Network interface
104. Magnetic disc unit

DESCRIPTION OF THE INVENTION

The present invention provides methods, apparatus and systems to monitor communications conducted via a host computer as well as communications conducted directly. The present invention also enables to detection of intrusions or attacks, including unauthorized access, in real time through such monitoring without the need for communications logs known to be those of unauthorized access.

In an example embodiment, the present invention is implemented as a communications monitoring system comprising: a packet input means for receiving communications packets flowing at arbitrary points on a network; and matching means for performing real-time matching between two packet streams composed of communications packets.

In this communications monitoring system, the packet input means may be a communications sensor connected to predetermined points (points where communications are to be monitored) on a network via a network interface while the matching means may be a similarity calculator which calculates formal similarity between two packet streams composed of communications packets entering the sensor upon arrival of the communications packets.

In some embodiments, the communications monitoring system further comprises alerting means for sending out a predetermined alert to an operator, administrative function, etc. according to the formal similarity between the two packet streams determined by the matching means.

The formal similarity between two packet streams means similarity in the amount of data and transmission interval of packets irrespective of data content and is determined based on a time lag between each corresponding pair of communications packets in the two packet streams. More specifically, the two packet streams can be represented by graphs depicting amounts of data in communications packets in respective packet streams with respect to elapsed time and calculates similarity between the two packet streams based on size of regions enclosed by the two graphs when the graphs of the packet streams are moved close to each other without intersecting each other.

In another embodiment, the present invention can be implemented as a communications monitoring method for monitoring data communications on a network using a computer, comprising the steps of: acquiring communications packets in sequence from arbitrary points on a network and storing them in predetermined storage means together with information about a packet stream to which the communications packets belong; on reception of a predetermined communication packet, taking another communications packet received within a predetermined time before acquiring a predetermined communications packet, out of the storage means; determining formal similarity between the first packet stream which contains up to the acquired communications packet and a second packet stream to which the communications packet taken out of the storage means belong; and sending out a predetermined alert according to the determined similarity.

In a further embodiment, the communications monitoring method further comprises a step of discarding information used in determining the similarity of second packet streams except the second packet stream determined to be most similar to the first packet stream. This makes it possible to reduce memory usage and CPU loads on the computer.

The present invention is also implemented as an information processing method for comparing two packet streams flowing on a network, comprising the steps of: acquiring communications packets in sequence from arbitrary points on a network and storing them in predetermined storage means together with information about a packet stream to which the communications packets belong; on reception of a predetermined communication packet, taking another communications packet received within a predetermined time before acquiring a predetermined communications packet, out of the storage means; and performing matching between the first packet stream which contains up to the acquired communications packet and a second packet stream to which the communications packet taken out of the storage means belong.

Advantageously, in the step of calculating the similarity between the packet streams, the information processing method discards information used in determining the similarity if time-axis lengths of the regions enclosed by the two graphs are within a specific predetermined range. This makes it possible to reduce memory usage and CPU loads on the computer.

Furthermore, the present invention is also implemented as a program which controls a computer and makes it execute processes corresponding to the steps of the above described communications monitoring method or information processing method as well as a program for making the computer implement the functions of the above described communications monitoring system. These programs can be distributed in a magnetic disk, optical disk, semiconductor memory, or other recording medium, or delivered via a network.

Figure 1:
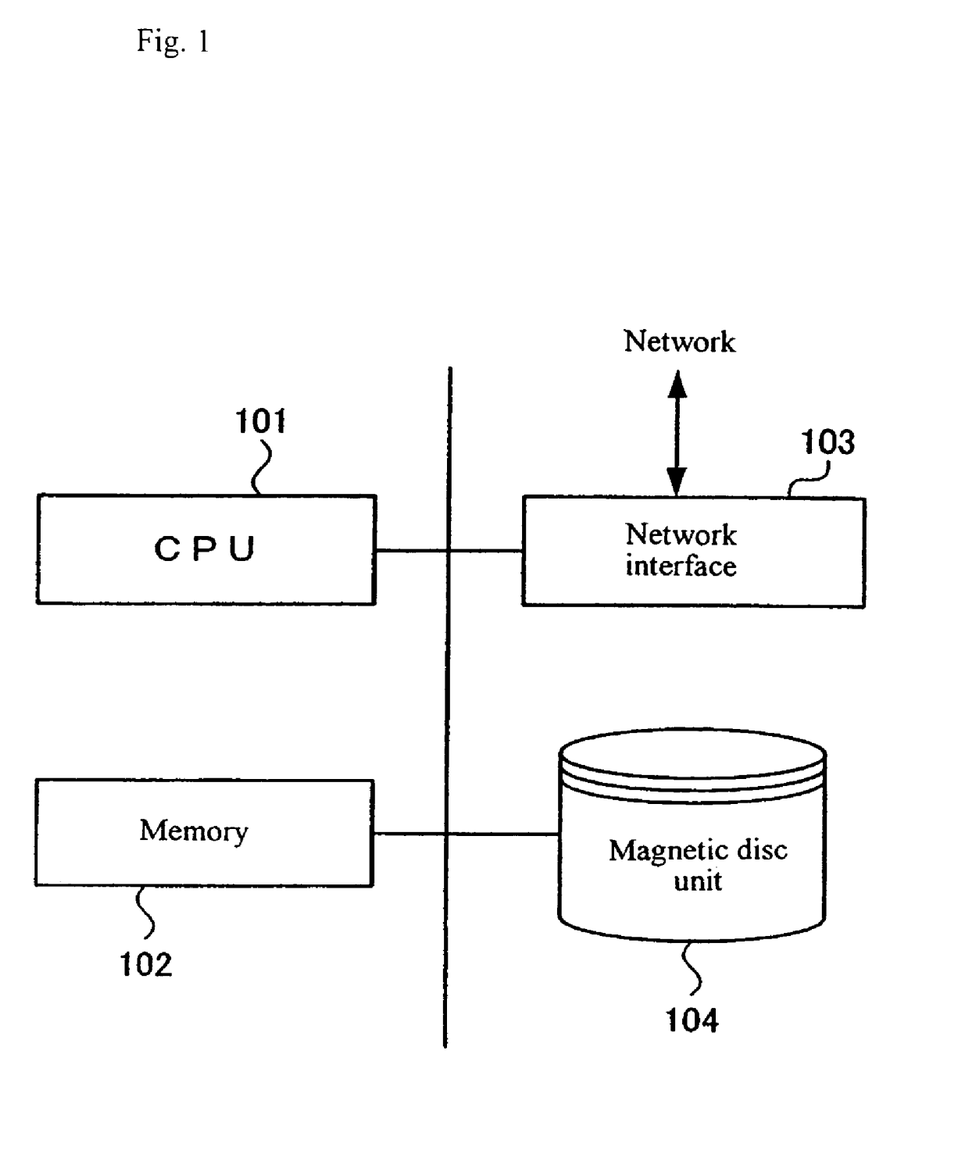
FIG. 1 is a diagram showing a configuration of a computer which implements a communications monitoring system according to an example embodiment of the present invention.

The present invention will be described further in detail below with reference to an embodiment illustrated in the accompanying drawings. Incidentally, in this example embodiment, TCP (Transmission Control Protocol) is used as a network communications protocol. FIG. 1 is a diagram showing configuration of a computer which implements a communications monitoring system according to this embodiment. As shown in FIG. 1, the computer which implements this embodiment comprises a CPU 101 which runs various processes, memory 102 which stores programs for controlling the CPU 101 and data processed by the CPU 101, and network interface 103 for inputting packets transmitted and received over a network. Also, the computer comprises a magnetic disc unit 104 and saves programs and data stored in the memory 102 to the magnetic disc unit 104 as required.

Figure 2:
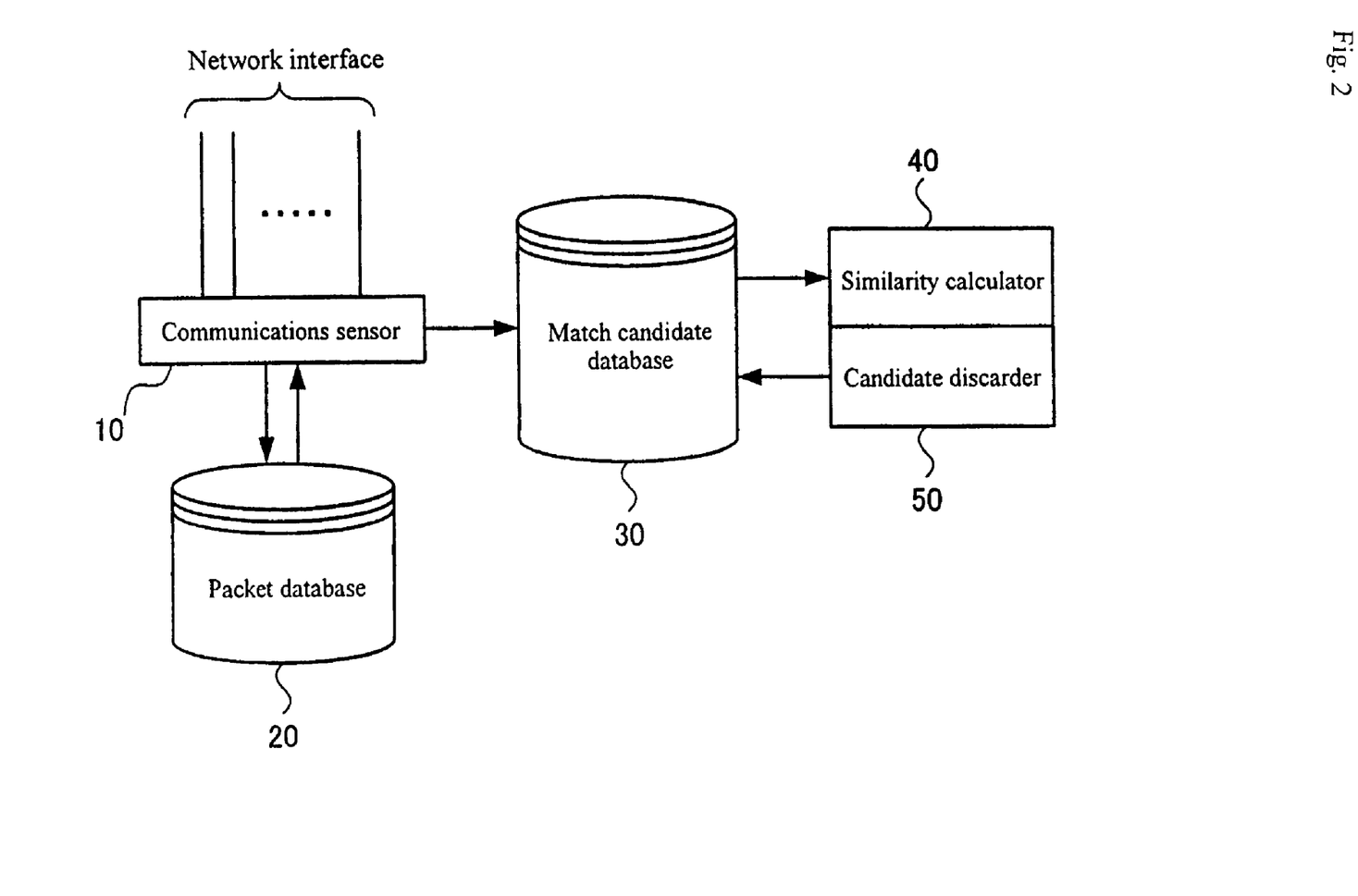
FIG. 2 is a diagram illustrating a functional configuration of the communications monitoring system according to this embodiment, including the computer, etc. shown in FIG. 1.

FIG. 2 is a diagram illustrating functional configuration of the communications monitoring system according to this embodiment, consisting of the computer, etc. shown in FIG. 1. Referring to FIG. 2, the communications monitoring system according to this embodiment comprises a communications sensor 10, packet database (DB) 20, match candidate database 30, similarity calculator 40, and candidate discarder 50. Of these components, the communications sensor 10, similarity calculator 40, and candidate discarder 50 are implemented by the program-controlled CPU 101 of the computer shown in FIG. 1. Programs which implement these components can be distributed in a magnetic disk, optical disk, semiconductor memory, or other recording medium or delivered via a network. In the example of FIG. 1, they are stored in the magnetic disc unit 104, are read into the memory 102, control the CPU 101, and thereby implement the functions of the above components. On the other hand, the packet database 20 and match candidate database 30 are implemented by the memory 102 and magnetic disc unit 104.

In the configuration shown in FIG. 2, the communications sensor 10 connects, via the network interface 103 shown in FIG. 1, to predetermined points where packets on the network will be monitored, receives flowing packets, and stores them in the packet database 20. It is possible to connect to any number of points, but communications are monitored with respect to packets flowing through two of them. If an input packet is a start packet of TCP communications, it is stored in the match candidate database 30. If the input packet is suspected to be from an intruder or attacker, an alert is sent out (to an operator, predetermined administrative function, etc.). Thus, the communications sensor 10 functions as packet input means, match candidate preparation means, and alerting means. Detailed operation of the communications sensor 10 will be described later.

The packet database 20 stores information about packets (hereinafter referred to as packet information) obtained by the communications sensor 10. Packet information contains the arrival time and sequence number of a given packet as well as packet stream information. A packet stream consists of packets flowing in one direction out of packets exchanged in one TCP communications session. Packet stream information contains a set of four items—source IP address, destination IP address, source port number, and destination port number—which represent a TCP connection as well as orientation with respect to the TCP connection (whether the packet stream is oriented in the same direction or opposite direction to the TCP connection). The packet information can be obtained from the acquired packet itself, its header information, etc. As database access capabilities, the packet database 20 has capabilities to:

1. retrieve a list of relevant packets using packet stream information as an index, and
2. retrieve packets in time order.

The match candidate database 30 stores match candidates for use in packet stream matching described later. A match candidate is a data structure which is used to hold in-progress reports on calculation of similarity between two TCP communications sessions (described later) and consists of two packet streams, sequence number offsets, and similarity. Thus, the match candidate database 30 contains the following information.

Packet stream to be checked
Packet stream for comparison
Sequence number offset
Similarity information (area, maximum length, and minimum length: details will be described later).

Also, as database access capabilities, the match candidate database 30 has capabilities to retrieve match candidates using the packet stream for comparison as an index.

The similarity calculator 40 is a matching means which acquires a match candidate packet stream from the match candidate database 30, compares it with a packet stream acquired by the communications sensor 10, and calculates formal similarity (similarity in the amount of data and transmission interval of packets irrespective of data content) between the packet streams under instructions from the communications sensor 10. The concept and calculation method of similarity will be described in detail later.

To avoid explosion in the number of match candidates for a predetermined packet stream, the candidate discarder 50 erases (discards) match candidates in the match candidate database 30 as required.

Next, operation of this embodiment will be described assuming a concrete situation in which network communications need to be monitored by this embodiment.

Figure 8:
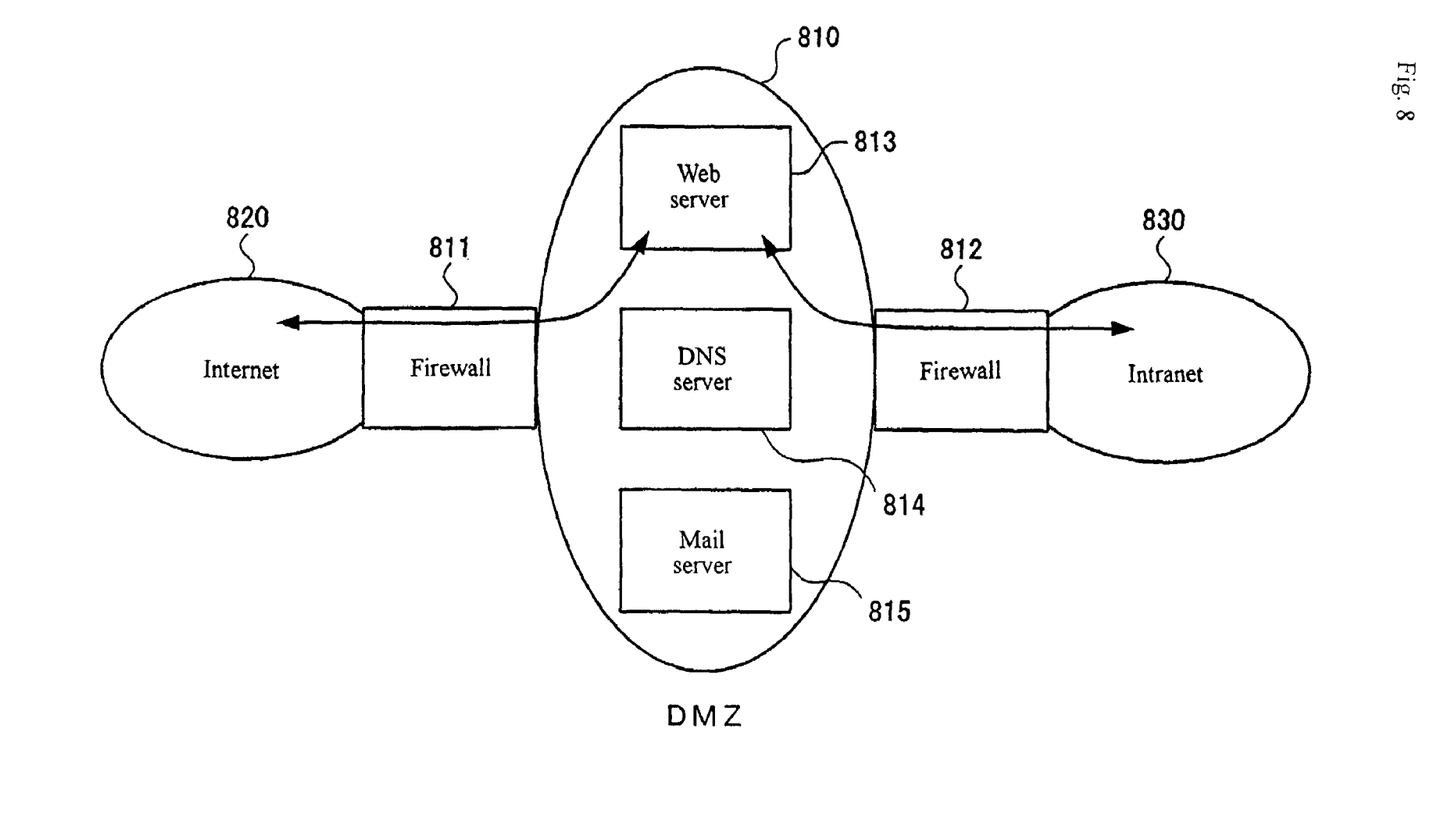
FIG. 8 is a diagram showing a configuration example of a DMZ (De-Militarized Zone)

FIG. 8 is a diagram showing a configuration example of a DMZ (De-Militarized Zone). As shown in FIG. 8, the DMZ 810 has been configured such that inner servers (Web server 813, DNS server 814, and mail server 815) can be accessed from the Internet 820 and an intranet 830 only through a firewall 811 or 812. The existence of the DMZ 810 makes it possible to pass only the traffic which is based on HTTP (HyperText Transfer Protocol), SMTP (Simple Mail Transfer Protocol), or other accepted communications protocols. In FIG. 8, rules have been set up for the firewall 811 to allow access to the Web server 813 from the Internet 820 while rules have been set up for the firewall 812 to allow access to the Web server 813 from the intranet 830. This allows for e-mail delivery from the Internet 820 to the intranet 830, for example. In this case, TCP communications along an intrusion route (indicated by arrows in FIG. 8) running from the Internet 820 to a server in the DMZ 810 (e.g., the Web server 813 in FIG. 8) and then from the server in the DMZ 810 to the intranet 830, as with the e-mail delivery route above, are difficult to detect with intrusion detection tools of the firewalls 811 and 812 or the like because they comply with the rules of the firewalls 811 and 812.

Computers which use a network provided by a service provider (ISP: Internet Service Provider) can be used as stepping stones for similar intrusions. Filtering on a router cannot prevent such computers from being used as stepping stones.

To prevent intrusions and attacks which use secure host computers on a network as relay points, this embodiment advantageously monitors communications at points which could be used as relay points. To acheive this, for example, in the communications monitoring system shown in FIG. 2, the communications sensor 10 is connected to desired points via the network interface 103. Specifically, to monitor TCP communications conducted via the DMZ 810 shown in FIG. 8, the communications sensor 10 is connected to an interface of the firewall 811 on the side of the DMZ 810 and an interface of the firewall 812 on the side of the intranet 830. To watch for any use of a host computer as a stepping stone, the communications sensor 10 is connected to Internet-side interfaces of the router. Incidentally, the communications sensor 10 can make as many connections as there are points to be monitored, but detection results are given as similarity between packet streams at two points.

If it is detected that very similar packet streams are transmitted (TCP communications are conducted) at the two points at a small time interval, it is likely that the network or a system connected to the network is intruded. In such a case, according to this embodiment, a warning is issued to prompt the operator and the like to take necessary measures.

Now, similarity between two packet streams will be described.

Figure 3:
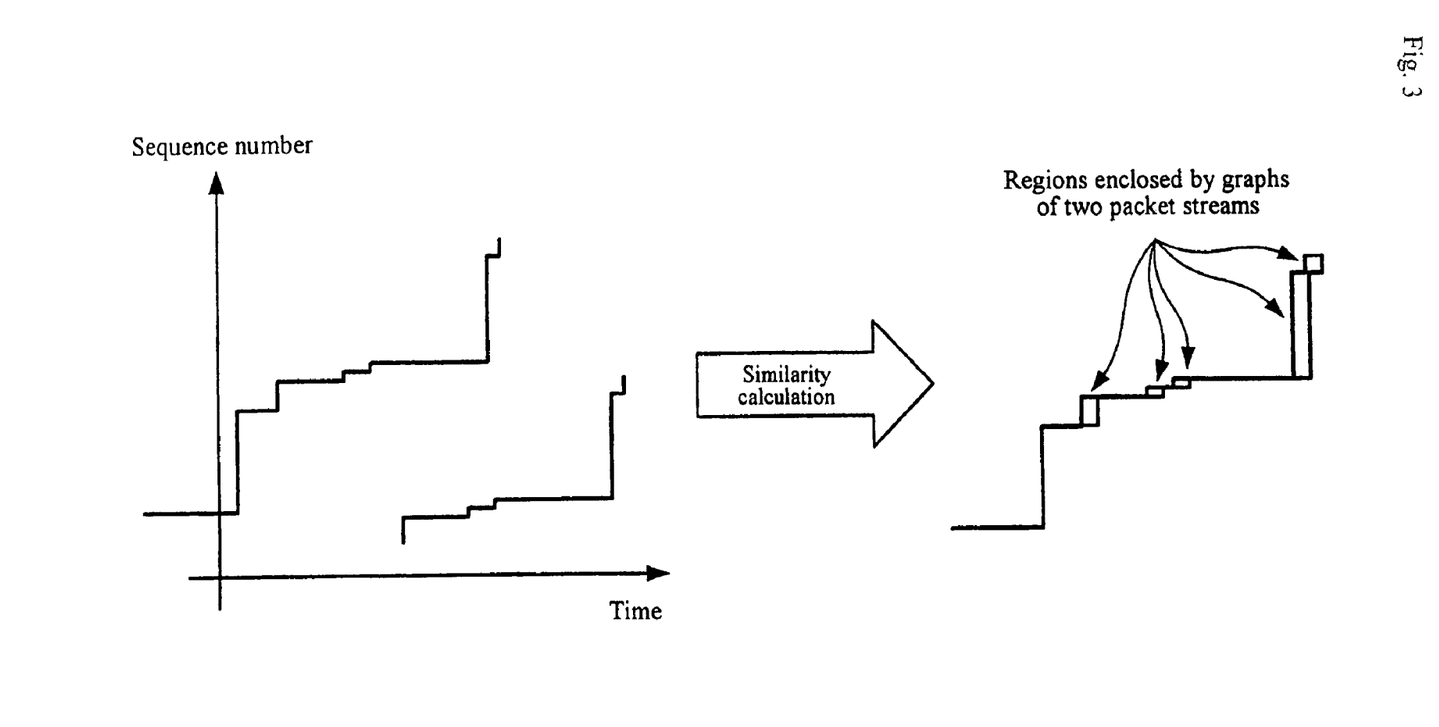
FIG. 3 is a diagram expressing two packet streams, observed by a communications sensor according to this embodiment, as changes in sequence numbers with respect to time.

FIG. 3 is a diagram expressing two packet streams, observed by the communications sensor 10, as changes in sequence numbers with respect to time. The sequence number represents data transmitted so far by TCP communications. A random number is used as an initial value and the sequence number is incremented by the amount of data transmitted. In FIG. 3, increases in sequence numbers (i.e., amount of data transmitted) are graphed with respect to time. The shapes of the graphs in FIG. 3 are considered to represent formal characteristics of the packet streams. Thus, the similarity between two packet streams according to this embodiment is defined as the minimum X-axis (time axis) dimension (time lag) divided by the Y-axis dimension (amount of transmitted data represented by the sequence number) of regions enclosed by the two graphs when the graphs of the packet streams are moved close to each other without intersecting each other. In other words, the similarity between the two packet streams is determined based on the time lag between each corresponding pair of communications packets in the two packet streams. Thus, similarity information about match candidates stored in the match candidate database 30 is represented by the total area of the regions enclosed by the graphs of the two packet streams, maximum length in the X-axis direction, and minimum length in the X-axis direction (hereinafter parameters which represent the size of these areas are simply called as the area, maximum length, and minimum length).

When the similarity between two packet streams is defined in this way, the similarity is not supposed to be calculated until communications in one direction are finished. However, to check two packet streams for a match in real time, it is not desirable that loads are concentrated at the end of communications. Thus, according to this embodiment, a similarity candidate is calculated little by little each time a packet is received.

Figure 4:
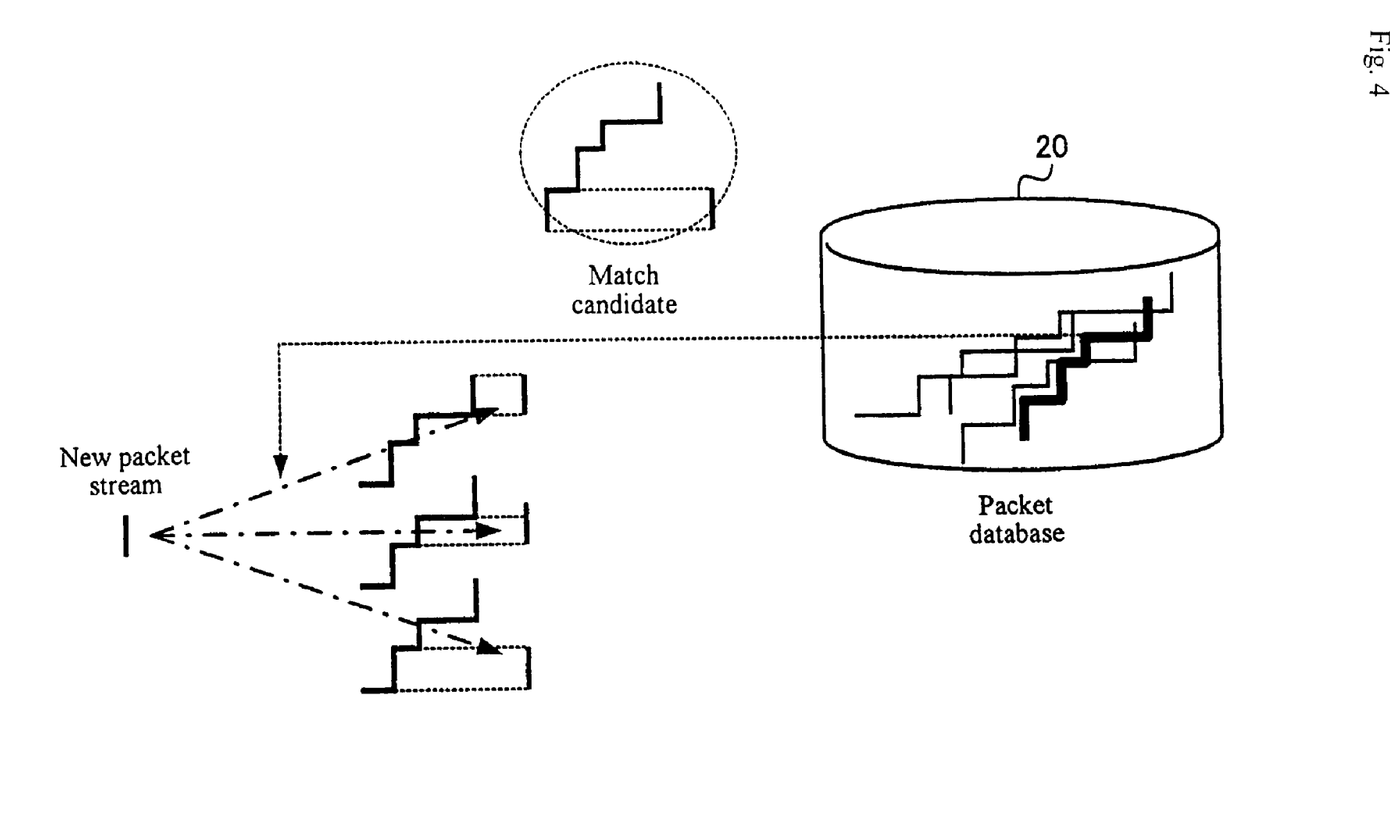
FIG. 4 is a diagram illustrating a packet stream matching method according to this embodiment.

FIG. 4 is a diagram illustrating a packet stream matching method according to this embodiment.

Since random numbers are used as the initial values of sequence numbers as described above, for the sake of comparison, sequence number offsets are determined for all packet streams to be checked at the start of the packet stream for comparison. Then, match candidates which contain information about the packet streams to be checked and sequence number offsets are prepared. Incidentally, at the start of the packet stream, initial values (described later) are used as similarity information about the first packet of the packet stream for comparison.

As the packet stream for comparison advances as packets are received one after another, changes in the similarity of match candidates are calculated. The calculation of changes include calculating the area and maximum length and minimum length in the X-axis direction of a region newly enclosed as the graphs progress. The similarity of each match candidate is given by the following formula. According to this method, since only the changes resulting from the progress of the graphs need to be calculated, computational loads can be distributed.

Similarity=min[|area−minimum length*height|, |area−maximum length*height|]/height The processing time and memory required by the communications monitoring system is proportional to the number of match candidates. The number of match candidates is given by O[(number of packet streams$^2$)*(number of packets in a packet stream)]

Thus, for real-time processing, match candidates must be reduced as required in the process of calculating similarity. For that purpose, this embodiment uses time lags between two TCP communications.

Now lets consider time lags between two TCP communications which are checked for a match according to this embodiment. In the case of communications from the Internet to an intranet via a server in the DMZ 810 in FIG. 8, for example, a time lag is caused as the communications are conducted via one or two host computers. In the case of communications in which a network provided by an ISP is used as a stepping stone, a time lag is caused as the communications are conducted via a small network. These time lags are not more than half the command response time on the terminal of the intruder. Thus, it is assumed that the time lag between the two TCP communications which are checked for a match can be kept under approximately 1 to 2 seconds (this time lag is referred to as the maximum packet delay time).

Thus, during match candidate preparation, if the lag between the arrival times of corresponding packets in two packet streams is larger than the maximum packet delay time, no match candidate is prepared. Also, when updating a match candidate upon reception of a packet, if the maximum length in the X-axis direction shown FIG. 4 exceeds the maximum packet delay time or the minimum length is smaller than the negative value of the maximum packet delay time (negative maximum packet delay time), the candidate discarder 50 erases the match candidate from the match candidate database 30. These processes make it possible to reduce memory usage and calculation time in the communications monitoring system.

Figure 5:
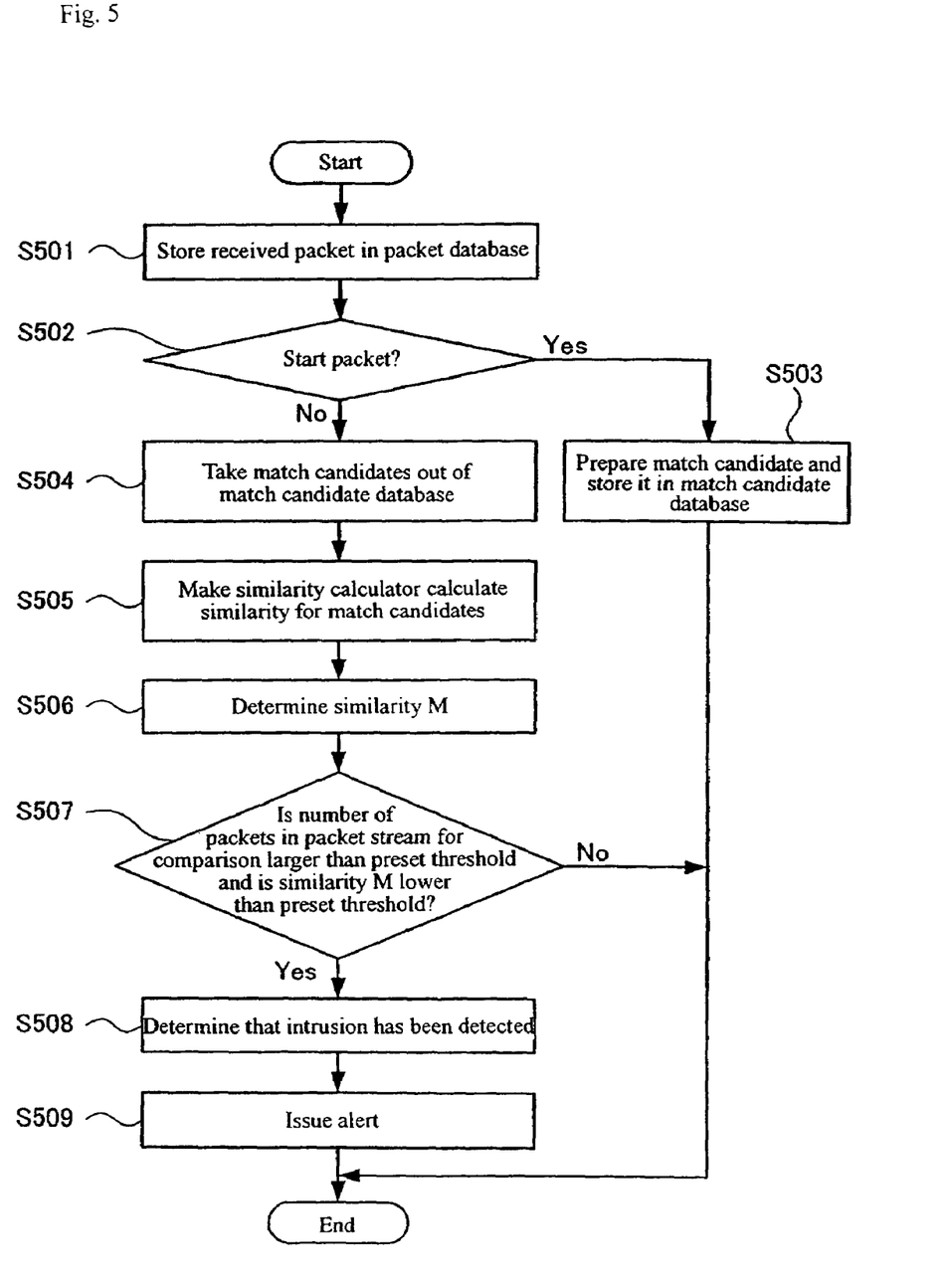
FIG. 5 is a flowchart illustrating operation of the communications sensor according to this embodiment.

FIG. 5 is a flowchart illustrating operation of the communications sensor 10 under the above circumstances. As shown in FIG. 5, the communications sensor 10 receives a packet via the network interface 103 and stores it in the packet database 20 (Step 501). If the packet is the start packet of a packet stream (start of TCP communications), the communications sensor 10 prepares a match candidate according to procedures described later and stores it in the match candidate database 30 (Steps 502 and 503).

On the other hand, if the packet received is not the start packet of a packet stream, the communications sensor 10 performs packet stream matching. Specifically, first, using the packet stream (packet stream for comparison) which contains the received packet as an index, the communications sensor 10 takes match candidates out of the match candidate database 30 (Steps 502 and 504). Then, the similarity calculator 40 calculates similarity for each of the match candidates (Step 505). Processes of the similarity calculator 40 will be described later.

Next, based on the output from the similarity calculator 40, the communications sensor 10 designates the lowest similarity among the similarities of the match candidates as similarity M (Step 506). If the number of packets in the packet stream for comparison is larger than a preset threshold (i.e., the packet stream for comparison is equal to or longer than a fixed length) and the similarity M is lower than a preset threshold, the communications sensor 10 determines that an intrusion has been detected (Steps 507 and 508). Then, the communications sensor 10 sends out the information about the match candidate as warning information (Step 509).

After Step 506, the communications sensor 10 instructs the candidate discarder 50 to erase the match candidates except the one with the similarity M from the match candidate database 30 (to reduce match candidates).

Figure 6:
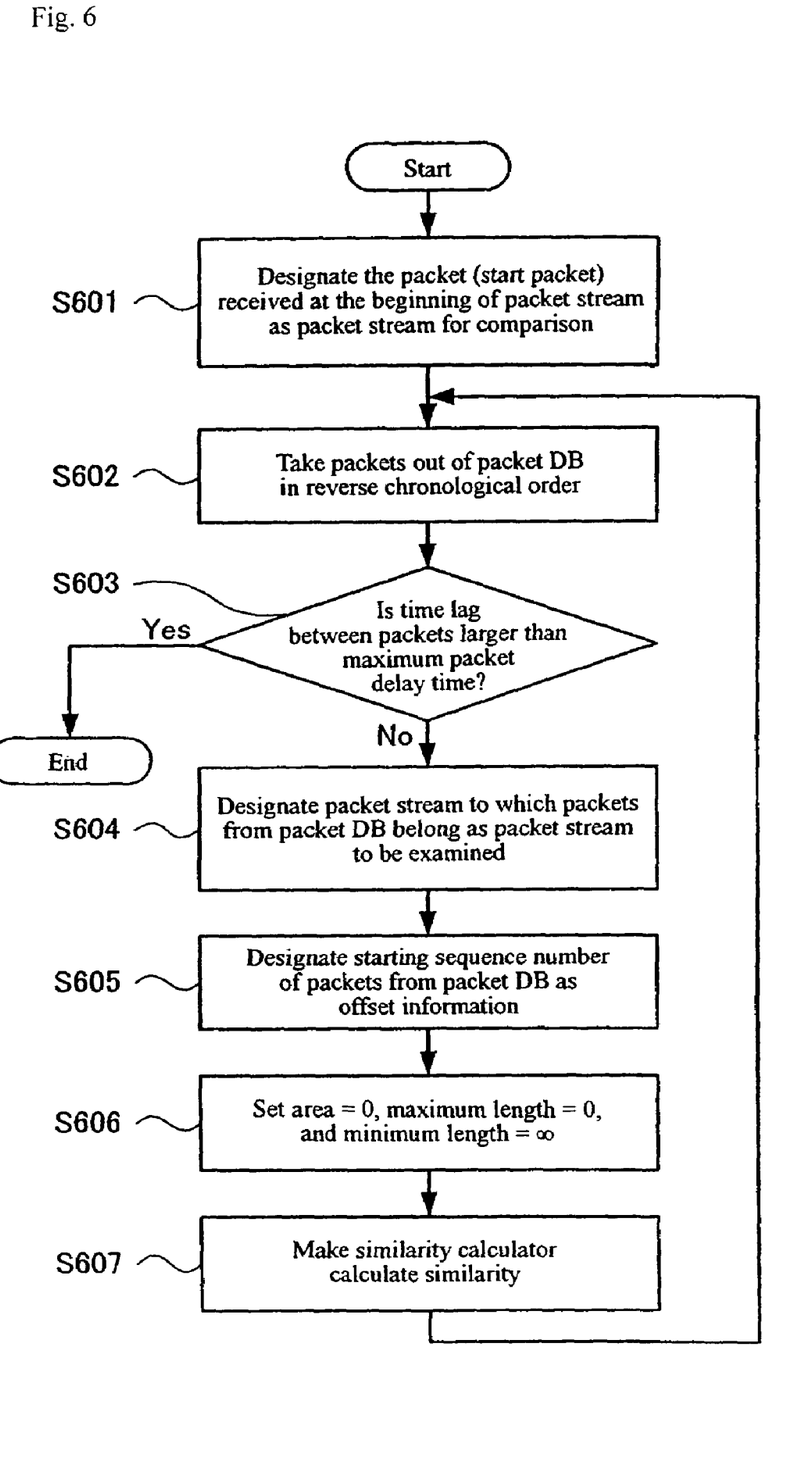
FIG. 6 is a flowchart illustrating preparation of match candidates in Step 503 of FIG. 5.

FIG. 6 is a flowchart illustrating preparation of match candidates in Step 503. As shown in FIG. 6, the communications sensor 10 designates the packet (start packet) received at the beginning of a packet stream as the packet stream for comparison (Step 601). Then, the communications sensor 10 takes packets out of the packet database 20 in reverse chronological order (Step 602). If the time lag between the packets taken out of the packet database 20 and the packet stream for comparison (received packet) exceeds the maximum packet delay time, the communications sensor 10 finishes processing (Step 603).

On the other hand, if the time lag between the packets taken out of the packet database 20 and the packet stream for comparison does not exceed the maximum packet delay time, the communications sensor 10 retrieves the packet stream to which the packets belong from the packet database 20 and designates it as a packet stream to be examined (Steps 603 and 604). Then, the communications sensor 10 designates the starting sequence number of the retrieved packets as offset information (Step 605) and sets initial values of similarity information as follows: area=0, maximum length=0, and minimum length=∞ (Step 606). Next, the similarity calculator 40 calculates similarity (Step 607). Then the flow returns to Step 602 and the above processes are repeated until there is no more packet that would cause a smaller time lag with respect to the packet stream for comparison than the maximum packet delay time.

Through the above processes, as many match candidates are prepared as there are packets which cause a smaller time lag with respect to the packet stream for comparison than the maximum packet delay time.

Incidentally, in the above processes, no distinction is made between the two points connected with the communications sensor 10 in terms of which of them the packet stream for comparison and the packet stream to be checked are received from. Directions of communications are not distinguished either. Thus, according to this embodiment, matching is performed and similarity is calculated when two packet streams are obtained, with no distinction between the two points. This makes it possible to detect attacks which accesses the network through one communications path.

Figure 7:
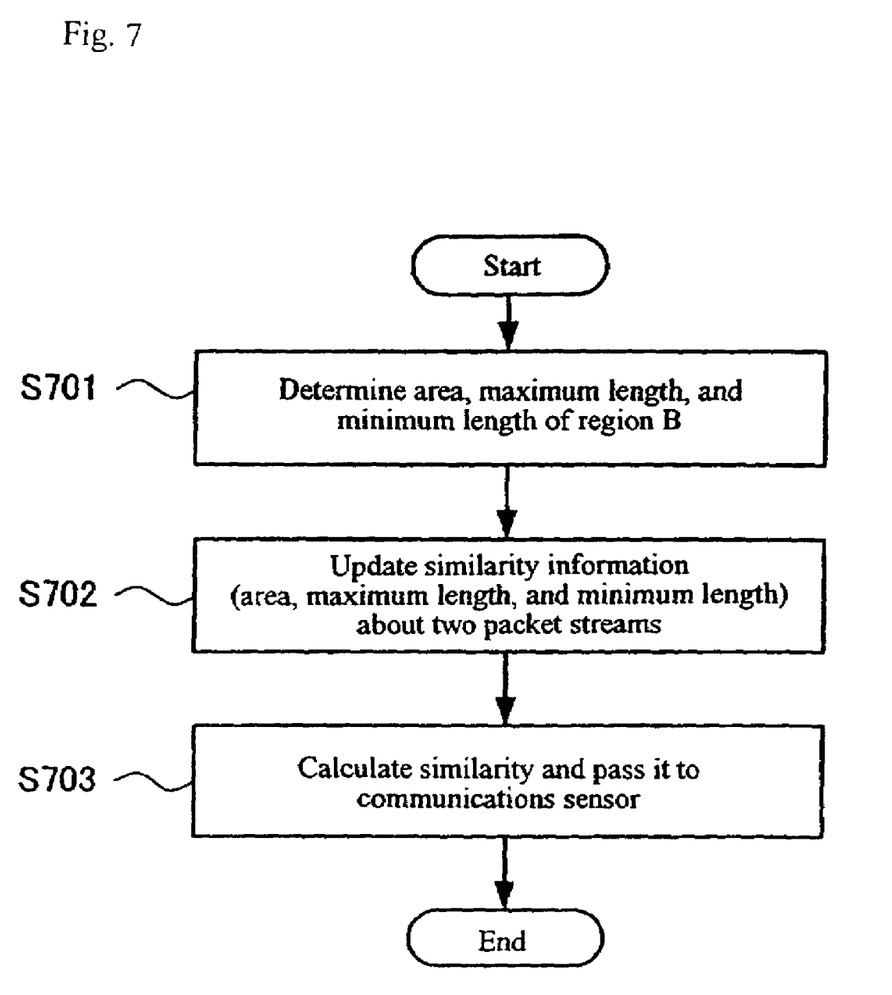
FIG. 7 is a flowchart illustrating a similarity calculation process carried out by a similarity calculator according to this embodiment.

FIG. 7 is a flowchart illustrating a similarity calculation process carried out by the similarity calculator 40. This process is performed under instructions from the communications sensor 10 using graphs such as those shown in FIG. 3 (see Step 505) each time the packet stream for comparison increases by one packet. The region newly enclosed by the new portions of the graphs as the packet is added is designated as region B and the area, maximum length, and minimum length of region B is determined (Step 701). Consequently, the similarity information about the two packet streams is updated as required (Step 702). Specifically, the updated area is given by Area=area just before update+area of region B If the maximum length of region B is larger than the maximum length just before the update, the updated maximum length is given by Maximum length=maximum length of B If the minimum length of region B is larger than the minimum length just before the update, the updated minimum length is given by Minimum length=minimum length of B Then, the similarity calculator 40 calculates similarity using the above parameters and passes the calculated similarity to the communications sensor 10 (Step 703).

If the maximum length of region B obtained in Step 701 exceeds the maximum packet delay time or the minimum length of region B is smaller than the negative value of the maximum packet delay time, the similarity calculator 40 instructs the candidate discarder 50 to erase the match candidate from the match candidate database 30 (to reduce match candidates).

Next, description will be given of an application example of this embodiment as applied to a concrete network system.

Figure 9:
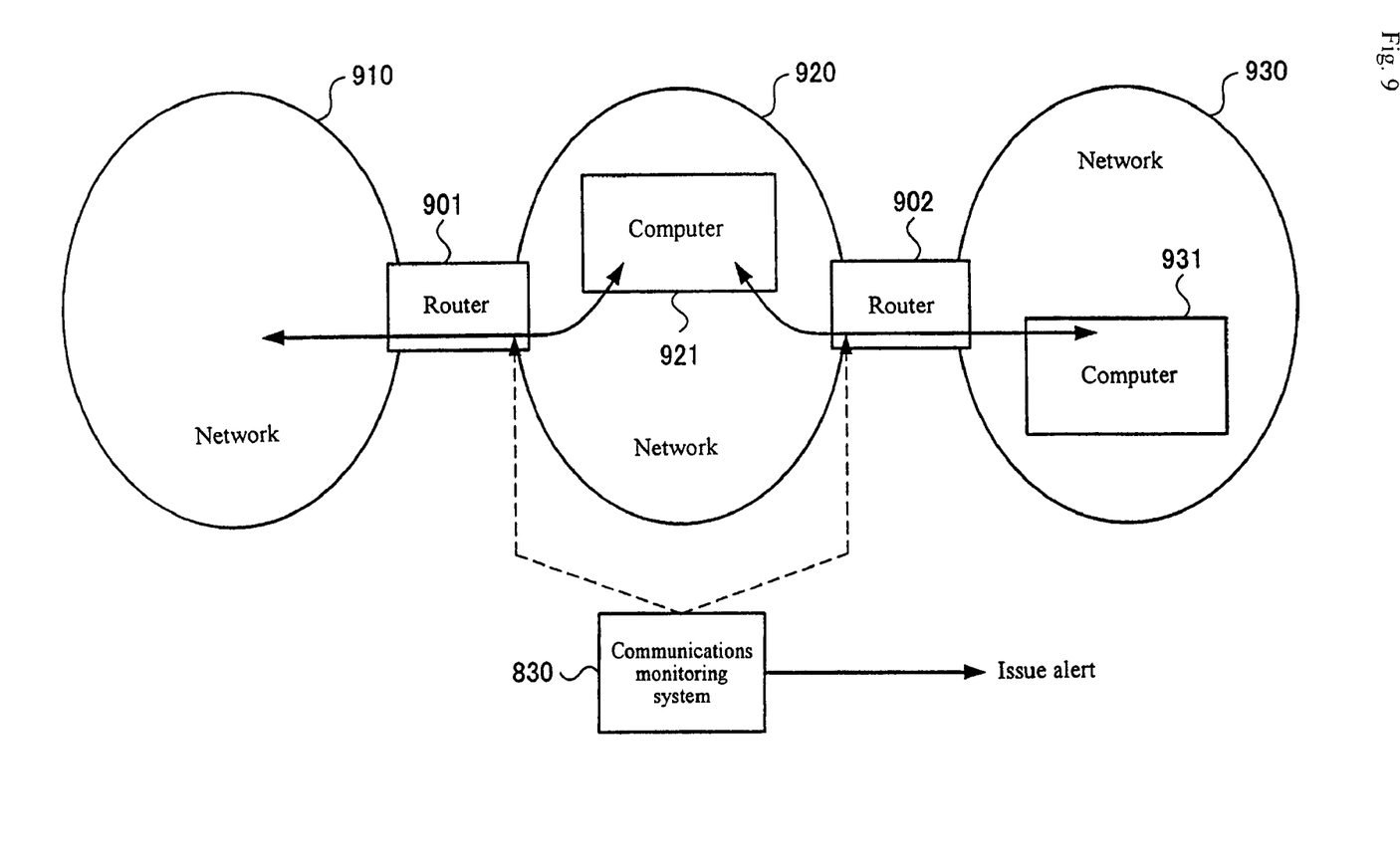
FIG. 9 is a configuration example for use when communications among a plurality of networks are monitored according to this embodiment.

FIG. 9 is a configuration example for use when communications among a plurality of networks are monitored according to this embodiment. Suppose a plurality of networks 910, 920, and 930 are connected via routers 901 and 902 as shown in FIG. 9. In comparison to FIG. 8, it can be assumed that the networks 910, 920, and 930 correspond to the Internet 820, DMZ 810, and intranet 830, respectively, while the routers 901 and 902 correspond to the firewalls 811 and 812, respectively. When watching for any use of a host computer as a stepping stone, a computer in the network 920 can be assumed to be a host computer 921.

In a network system configured as shown in FIG. 9, an attacker passes through the network 910 and first attacks the computer 921 in the network 920. Furthermore, it is assumed that by attacking a security hole in the computer 921, the attacker succeeds in attacking a computer 931 in the network 930. If it is assumed that the attacker communicates along the paths indicated by the solid arrows in FIG. 9, the packets related to this communication should pass through the router 901 and router 902.

The communications monitoring system according to this embodiment normally watches communications flowing through the router 901 and router 902, and thus instantly detects the communications initiated by the attacker. It reports the detected attack to an external administrative function.

In the example of FIG. 9, communications at two points are monitored by this embodiment, but it is also possible to monitor more than two points. In that case, relationship between communications at any two of the points is detected in real time. As a special case, the network 910 and network 930 may constitute an identical network. In that case, the communications sensor 10 is connected to one point, and this embodiment operates as a system which detects attacks made via the single network 920.

Incidentally, in the embodiment described above, TCP is used as a network communications protocol, but this embodiment is applicable to other communications protocols as well. It can be applied to network communications based on UDP or other protocols as appropriate. When applying this embodiment to another protocol, packet stream information used to search the packet database 20 and parameters used to calculate similarity are specified according to the packet format of the given protocol.

For example, if the communications protocol used is UDP, packet stream information contains a set of four items—source IP address, destination IP address, source port number, and destination port number while they are sorted in order of arrival time and UDP data size. When UDP is used, no such information as sequence numbers of TCP is available to calculate the total amount (bytes) of data flowing in each stream up to a certain time point. Therefore, "UDP data size" in a UDP header is used to calculate the total amount of transmitted data, which in turn is used as the Y-axis (vertical axis) of graphs in similarity calculation. Regarding the total amount of data flowing in each stream up to a certain time point, it can be calculated by totaling past UDP data sizes.

Thus as described above, the present invention makes it possible to monitor communications conducted via a host computer as well as communications conducted directly.

Also, the present invention makes it possible to detect intrusions or attacks, including unauthorized access, in real time through such monitoring without the need for communications logs known to be those of unauthorized access.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A communications monitoring system comprising:
   a communications sensor for receiving and monitoring in real time communications packets flowing at arbitrary points on a network, said communications being any of communications conducted via a host and communications conducted directly; and
   a similarity calculator for calculating formal similarity between two packet streams of similar duration composed of communications packets entering the sensor upon arrival of the communications packets, and said sensor employing said formal similarity in detecting an intrusion.

2. The communications monitoring system according to claim 1, wherein the similarity calculator represents the two packet streams by graphs depicting amounts of data in communications packets in respective packet streams with respect to elapsed time, and calculates similarity between the two packet streams based on size of regions enclosed by the two graphs when the graphs of the packet streams are moved close to each other without intersecting each other.

3. The communications monitoring system according to claim 1, wherein the communications sensor sends out a predetermined alert according to a similarity value calculated by the similarity calculator.

4. A communications monitoring system comprising:
   a packet input means for receiving communications packets flowing at arbitrary points on a network, said communications being any of communications conducted via a host and communications conducted directly; and matching means for performing real-time matching between two packet streams composed of communications packets received by the packet input means and employing said real-time matching in detecting an intrusion.

5. The communications monitoring system according to claim 4, wherein the matching means determines formal similarity between the two packet streams being similar in an amount of data and transmission interval of packets irrespective of data content and is determined based on a time lag between each corresponding pair of communications packets in the two packet streams.

6. The communications monitoring system according to claim 5, further comprising alerting means for sending out a predetermined alert according to the formal similarity between the two packet streams determined by the matching means.

7. A communications monitoring method for monitoring data communications using a computer, comprising the steps of:

acquiring in real time communications packets in sequence from arbitrary points on a network and storing them in predetermined storage means together with information about a packet stream to which the communications packets belong, said communications being any of communications conducted via a host and communications conducted directly;

on reception of a predetermined communication packet, taking another communications packet received within a predetermined time before acquiring a predetermined communications packet, out of the storage means;

determining formal similarity between the first packet stream which contains up to the acquired communications packet and a second packet stream to which the communications packet taken out of the storage means belong, said second packet stream being of similar duration of said first packet stream; and sending out a predetermined alert according to the determined similarity.

8. The communications monitoring method according to claim 7, wherein in the step of determining the formal similarity of packet streams, the formal similarity between the two packet streams is determined based on a time lag between each corresponding pair of communications packets in the two packet streams.

9. The communications monitoring method according to claim 7, further comprising a step of discarding information used in determining the similarity of second packet streams except the second packet stream determined to be most similar to the first packet stream.

10. An information processing method comprising comparing two packet streams flowing in real time on a network, the step of comparing comprising the steps of:

acquiring communications packets in sequence from arbitrary points on a network and storing them in predetermined storage means together with information about a packet stream to which the communications packets belong, said communications packets being in any of communications conducted via a host and communications conducted directly;

on reception of a predetermined communication packet, taking another communications packet received within a predetermined time before acquiring a predetermined communications packet, out of the storage means; and performing matching between the first packet stream which contains up to the acquired communications packet and a second packet stream to which the communications packet taken out of the storage means belong, wherein said second packet stream being of similar duration of said first packet stream.

11. The information processing method according to claim 10, wherein in the step of performing matching between the packet streams, the first and second packet streams are represented by graphs which depict increments of sequence numbers of communications packets in respective packet streams with respect to elapsed time and the similarity between the two packet streams is calculated based on size of regions enclosed by the two graphs when the graphs of the packet streams are moved close to each other without intersecting each other.

12. The information processing method according to claim 11, wherein in the step of calculating the similarity between the packet streams, information used in determining the similarity is discarded according to time-axis lengths of the regions enclosed by the two graphs.

13. An article of manufacture comprising a computer usable medium having computer readable program code means embodied therein for causing communications monitoring, the computer readable program code means in said article of manufacture comprising computer readable program code means for causing a computer to effect the steps of claim 7.

14. A program storage device readable by machine, tangibly embodying a program of instructions executable by the machine to perform method steps for communications monitoring, said method steps comprising the steps of claim 7.

15. An article of manufacture comprising a computer usable medium having computer readable program code means embodied therein for causing information processing, the computer readable program code means in said article of manufacture comprising computer readable program code means for causing a computer to effect the steps of claim 10.

16. A program storage device readable by machine, tangibly embodying a program of instructions executable by the machine to perform method steps for information processing, said method steps comprising the steps of claim 10.

17. A computer program product comprising a computer usable medium having computer readable program code means embodied therein for causing communications monitoring, the computer readable program code means in said computer program product comprising computer readable program code means for causing a computer to effect the functions of claim 1.

18. A computer program product comprising a computer usable medium having computer readable program code means embodied therein for causing communications monitoring, the computer readable program code means in said computer program product comprising computer readable program code means for causing a computer to effect the functions of claim 4.

19. The communications monitoring system according to claim 1, wherein the similarity calculator represents the two packet streams by graphs depicting amounts of data in communications packets in respective packet streams with respect to elapsed time, and calculates similarity between the two packet streams based on size of regions enclosed by the two graphs when the graphs of the packet streams are moved close to each other without intersecting each other, and wherein the communications sensor sends out a predetermined alert according to a similarity value calculated by the similarity calculator.

20. The information processing method according to claim 10, wherein in the step of performing matching between the packet streams, the first and second packet streams are represented by graphs which depict increments of sequence numbers of communications packets in respective packet streams with respect to elapsed time and the similarity between the two packet streams is calculated based on size of regions enclosed by the two graphs when the graphs of the packet streams are moved close to each other without intersecting each other, and wherein in the step of calculating the similarity between the packet streams, information used in determining the similarity is discarded according to time-axis lengths of the regions enclosed by the two graphs.

* * * * *